US008485311B2

(12) United States Patent
Mackenzie et al.

(10) Patent No.: US 8,485,311 B2
(45) Date of Patent: Jul. 16, 2013

(54) AIR DUCT ASSEMBLY FOR ENGINE

(75) Inventors: Steven K. Mackenzie, West Bloomfield, MI (US); Eric R. Tucker, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 138 days.

(21) Appl. No.: 13/040,378

(22) Filed: Mar. 4, 2011

(65) Prior Publication Data

US 2012/0222641 A1 Sep. 6, 2012

(51) Int. Cl.

| | |
|---|---|
| ***F02M 35/00*** | (2006.01) |
| ***F02M 35/10*** | (2006.01) |
| ***F02M 33/02*** | (2006.01) |
| ***F01N 1/00*** | (2006.01) |
| ***F01N 5/00*** | (2006.01) |
| ***F01N 13/08*** | (2010.01) |
| ***F16L 27/00*** | (2006.01) |
| ***F16L 27/12*** | (2006.01) |

(52) U.S. Cl.
USPC ........... 181/229; 181/212; 181/228; 181/247; 123/184.21; 123/518; 285/145.1; 285/302

(58) Field of Classification Search
USPC .................... 181/229; 123/184.21; 285/145.1
See application file for complete search history.

(56) References Cited

U.S. PATENT DOCUMENTS

| | | | | |
|---|---|---|---|---|
| 3,427,051 | A * | 2/1969 | White et al. | 285/145.5 |
| 3,574,358 | A * | 4/1971 | Cassel | 285/53 |
| 3,669,470 | A * | 6/1972 | Deurloo | 285/45 |
| 3,799,223 | A * | 3/1974 | Feneziani | 141/388 |
| 3,889,985 | A * | 6/1975 | Gartmann | 285/95 |
| 4,030,740 | A * | 6/1977 | Kniss et al. | 285/16 |
| 4,371,198 | A * | 2/1983 | Martin | 285/145.1 |
| 5,129,685 | A * | 7/1992 | Engel | 285/231 |
| 5,188,086 | A * | 2/1993 | Adkins et al. | 123/568.27 |
| 5,571,242 | A * | 11/1996 | Demorest | 123/184.21 |
| 5,603,531 | A * | 2/1997 | Maier | 285/145.1 |
| 5,746,453 | A * | 5/1998 | Roberts | 285/47 |
| 5,882,046 | A * | 3/1999 | Thomas | 285/226 |
| 6,131,960 | A * | 10/2000 | McHughs | 285/302 |
| 6,481,764 | B1 * | 11/2002 | Kwok | 285/382 |
| 6,983,957 | B2 * | 1/2006 | Bettinger | 285/302 |
| 7,168,417 | B2 * | 1/2007 | Arruda et al. | 123/518 |
| 7,458,366 | B2 * | 12/2008 | Luley et al. | 123/518 |
| 7,610,904 | B2 * | 11/2009 | Treier et al. | 123/516 |
| 2008/0264719 | A1 * | 10/2008 | Seko et al. | 181/229 |
| 2010/0089368 | A1 * | 4/2010 | Hirata et al. | 123/518 |

* cited by examiner

*Primary Examiner* — David Warren
*Assistant Examiner* — Christina Russell

(57) ABSTRACT

An air duct assembly supplies air from an air cleaner housing to an engine throttle and includes a first duct connected to the air cleaner housing and a second duct connected to the engine air intake. Open ends of the first and second ducts are spaced from one another and the second duct has a flared bell mouth at its open end. The second duct includes a sleeve that defines an attenuation chamber. A flexible bellows overlies the first and second ducts and the sleeve, and extends across the space between the first and second ducts to provide an airtight connection therebetween and flex during relative motion between the air cleaner housing and the engine air intake. A hydrocarbon adsorbing material can be housed within the attenuation chamber.

10 Claims, 2 Drawing Sheets

AIR DUCT ASSEMBLY FOR ENGINE

FIELD OF THE INVENTION

The invention relates to an air induction system for an engine and more particularly provides a new and improved duct assembly for accommodating relative movement between the engine and the air filter and for attenuating engine noise.

BACKGROUND OF THE INVENTION

Motor vehicle internal combustion engines use a throttle body to govern the engine power settings. Some engines have additional charging equipment including turbo and supercharger mechanisms that compress intake air upstream of the throttle body to enhance engine performance. All internal combustion engines must receive a constant supply of clean air in order to enable the combustion of the fuel. The engine induction system is located upstream of the engine air intake and its primary functions are air filtration and noise attenuation.

The induction system begins with an inlet duct which draws cool dry air into the system. The inlet duct will deliver the air into an air filter housing that has an internal filter to capture incoming particulates to protect the engine. The air filter housing will also typically have a mass air flow meter port and a sensor downstream of the filter, to meter the air for combustion. The outlet duct will be connected between the air filter housing and the engine air intake. The air filter housing can be mounted to the engine or on the vehicle body structure. If mounted on the body structure, the duct will need a compliant feature such as a flexible bellows to decouple normal engine motion from the body mounted air filter housing. The induction system provides a pathway to deliver filtered dry cool air to the engine.

Air induction systems must also attenuate acoustic noise that is produced from the engine. Vehicles must comply with Federal regulations limiting vehicle pass-by noise. The engine will release noise from the throttle body that has harmonic components that are orders of engine speed. It may also contain higher frequency content that is produced from high RPM components like turbos and superchargers. Inductions systems will use the air filter housing size, geometry, and high and low frequency tuners to meet defined sub-system performance noise targets.

Vehicle emission standards have been mandated by the Federal government. Some engines use a strategically placed hydrocarbon adsorber in the induction system to catch hydrocarbons that are leaking from parked engines. The hydrocarbon adsorber uses carbon or other materials to capture the hydrocarbons before they escape the induction system and enter the environment. The adsorber is typically packaged on the clean filtered side of the induction system and has some exposed surface area adjacent to incoming air flow streams. This exposure allows the hydrocarbons to be captured upon engine shutdown and then be stripped from the adsorber material when the engine is running.

Induction system pressure loss is very important to develop peak engine power. Internal air flow within a duct will add incremental restriction if the area is constricted or if the boundary condition is irregular or coarse. Studies have shown that internal air flow within the bellows region of the duct assembly develops a higher restriction than flow through a smooth tube.

The clean air duct must fit within the distance between the air filter housing and the engine air inlet. Some applications can present a very short duct length due to the close proximity of the engine inlet and air filter housing. Incorporation of a high frequency tuner will reduce the available length for the bellows. The shorter length will eliminate convolutes increasing the stress per convolute reducing the durability life of the duct. Applications with short longitudinal lengths where length is consumed by bellows and tuner limit hydrocarbon filter space. It would be desirable to provide a new and improved air duct assembly for efficiently communicating air from the air filter housing to the engine air intake in a limited packaging space.

SUMMARY OF THE INVENTION

An air duct assembly supplies air from an air cleaner housing to an engine throttle and includes a first duct connected to the air cleaner housing and a second duct connected to the engine air intake. Open ends of the first and second ducts are spaced from one another and the second duct has a flared bell mouth at its open end. The second duct includes a sleeve that defines an attenuation chamber. A flexible bellows overlies the first and second ducts and the sleeve, and extends across the space between the first and second ducts to provide an airtight connection therebetween and flex during relative motion between the air cleaner housing and the engine air intake. A hydrocarbon adsorbing material can be housed within the attenuation chamber.

BRIEF DESCRIPTION OF THE DRAWINGS

The present invention will become more fully understood from the detailed description and the accompanying drawings, wherein.

DESCRIPTION OF THE INVENTION

The following description of certain exemplary embodiments is exemplary in nature and is not intended to limit the invention, its application, or uses.

Figure 1:
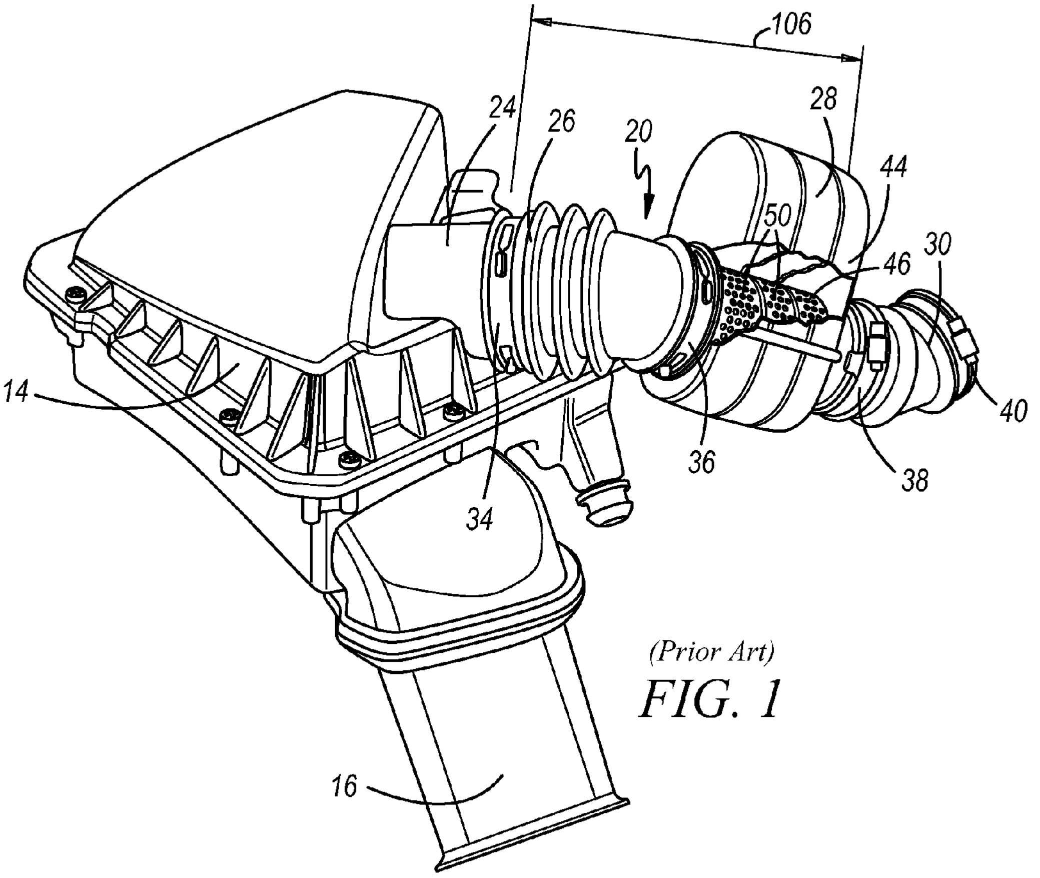
(Prior Art) FIG. 1
FIG. 1 is a perspective view of an air induction system of the prior art and having a bellows and a sound attenuating tuner.

Referring to FIG. 1, a prior art air induction system provides clean air to an engine air intake. The air induction system includes an air filter housing 14 that contains an air filter, not shown. Ambient air enters the air filter housing 14 through an air inlet duct 16. After passing through the filter that is housed within the housing 14, the air exits through an outlet duct assembly, generally indicated at 20. The air flow will continue into the engine air inlet which could be a throttle body, turbo or supercharger inlet. As seen in FIG. 1, the duct assembly 20 includes an air filter housing 24, a flexible bellows 26, a sound attenuating tuner 28, and a flexible bellows 30. The bellows 26 is attached to the air filter housing 24 with a hose clamp 34. The bellows 26 is attached to the tuner 28 by a hose clamp 36. The bellows 30 is attached to the tuner 28 by a hose clamp 38. The bellows 30 is attached to the engine air intake by a hose clamp 40. The tuner 28 is a plastic or metal tuner housing 44 that encloses a perforated duct portion 46. The perforated duct portion 46 is perforated by a plurality of openings 50. The tuner 28 is designed to attenuate noise emanating from the engine.

Figure 2:
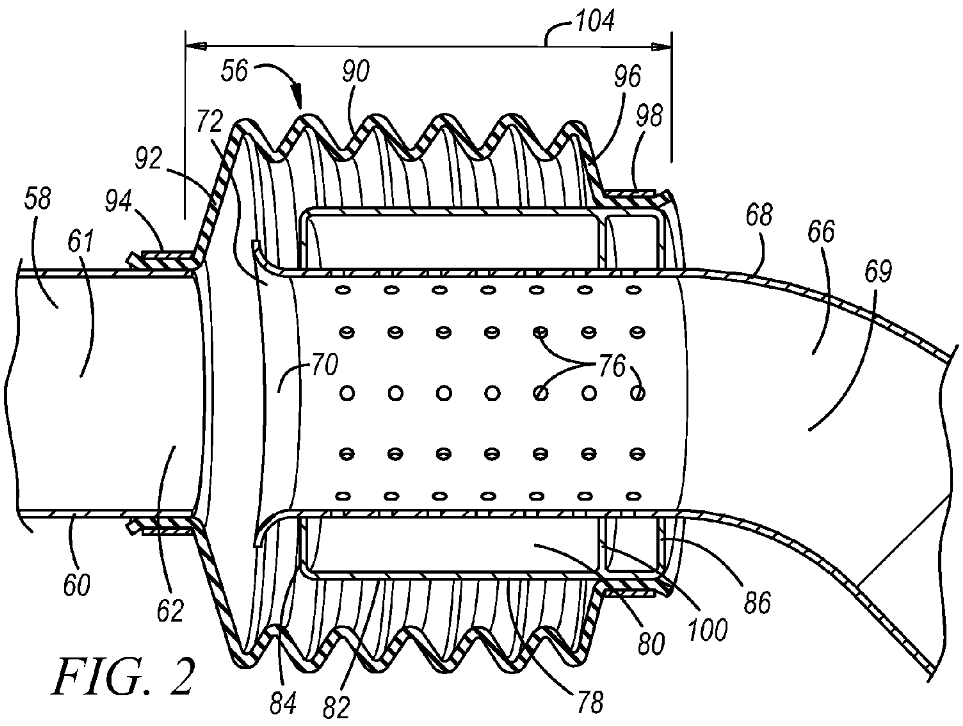
FIG. 2 is a cross section view taken through the air duct assembly of the present invention.

FIG. 2 shows a new and improved air duct assembly, generally indicated at 56. The first duct 58 has a duct wall 60 defining an air flow passage 61 and is connected to an air filter housing, not shown. The first duct 58 and air flow passage 61 have an open end 62. A second duct 66 is connected, either directly, or by a flexible connector, to the engine air intake, which can be either a throttle body, turbocharger, or supercharger. The second duct 66 has a duct wall 68 defining an air flow passage 69 with an open end 70. The duct wall 68 is flared outwardly at the open end 70 to create a bell mouth 72.

As seen in FIG. 2, the open end 62 of the first duct 58 is spaced from the bell mouth 72 of the open end 70 of the second duct 66. Also as seen in FIG. 2, a portion of the length of the second duct 66, generally adjacent the open end 70, is perforated to provide a plurality of openings 76 in the duct wall 68 of the second duct 66. FIG. 2 shows the openings 76 as being round holes, however, the openings 76 can be holes, slots, or any shape. The first duct 58 and the second duct 66 are preferably of molded plastic, but alternatively can be of metal construction.

The second duct 66 includes a sleeve 78 that creates an annular sound attenuation chamber 80. The sleeve 78 includes a concentric wall 82, and end walls 84 and 86. The end walls 84 and 86 extend radially inward from the concentric wall 82 and are suitably attached to the duct wall 68. As seen in FIG. 2, the sound attenuation chamber 80 is radially outboard of the air flow passage 69. The size of the attenuation chamber 80 will be determined by the diameter of the concentric wall 82 of the sleeve 78 and also the distance between the end walls 84 and 86. In particular, the distance between the end walls 84 and 86 determines the length of the attenuation chamber 80, and the radial extent of the end walls 84 and 86 will define the radial depth of the attenuation chamber 80. The sound that is emanating through the air duct assembly 56 in the form of high frequency perturbations of airflow is attenuated by passing through the perforated openings 76 and into the attenuation chamber 80. The sound attenuating characteristics of the attenuation chamber 80 can be tuned by properly sizing the volume of the attenuation chamber 80 and also the size, shape and number of the perforated openings 76.

The first duct 58 and the second duct 66 are connected together by a flexible bellows 90. The flexible bellows 90 is radially outboard of the second duct 66 and its sleeve 78 and the attenuation chamber 80. As seen in FIG. 2, a left-hand end 92 of the bellows 90 is attached to the first duct 58 by a clamp 94 and a right-hand end 96 of the bellows 90 is connected to the sleeve 78 at its end wall 86 and attached by a clamp 98. The sleeve 78 has a support rib 100 that underlies the clamp 98 so that the installation of the clamp 98 will not deform the sleeve 78.

In operation, the engine air intake will draw air through the duct assembly 56 and through the air filter housing 14. The air flows through the air flow passage 61 of the first duct 58 and then across the space between the first duct 58, and into the second duct 66. The space between the ends of the ducts 58 and 66 will permit the two ducts 58 and 66 to move relative to one another during movement of the engine. The bell mouth 72 will smooth the air flow across the space between the ends of the ducts 58 and 66 and smooth the intake of the air flow into the open end 70 of the duct 66. The bellows 90 is flexible and can yield as needed to accommodate the relative movement between the first duct 58 and the second duct 66. Engine noise that is emanating through the duct 66 in the form of high frequency air vibrations can be attenuated by escaping through the openings 76 into the attenuation chamber 80.

Thus, as shown in FIG. 2, the attenuation chamber 80 and the bellows 90 are provided concentric with one another and are concentric with the air flow passage 69. By arranging the attenuation chamber 80 and the bellows 90 in this fashion, the flexibility function provided by the bellows 90 and attenuation function provided by the attenuation chamber 80 can be performed within an overall length designated 104. In contrast, referring again to FIG. 1, we see that the prior art air duct assembly had arranged the bellows 26 and 30, and the tuner 28 in series, and required a greater length 106 in order to perform the functions of flexibility and sound attenuation. In addition, comparing the prior art of FIG. 1 with the invention of FIG. 2, it is seen that, in the prior art air duct assembly of FIG. 1, the air passing through the duct assembly 20 was exposed directly to the convolutions on the inside of the bellows 26 and 30, which in turn creates incremental restriction. In contrast, in the new and improved air duct of FIG. 2, the airflow can pass directly from the open end 62 of the first duct 58 and into the second duct 66 without exposure to the convoluted wall of the bellows 90. In addition, the bell mouth 72 aids in maintaining an aligned flow of air through the duct assembly 56 even during relative movement between the ducts 58 and 66 caused by engine movement.

Figure 3:
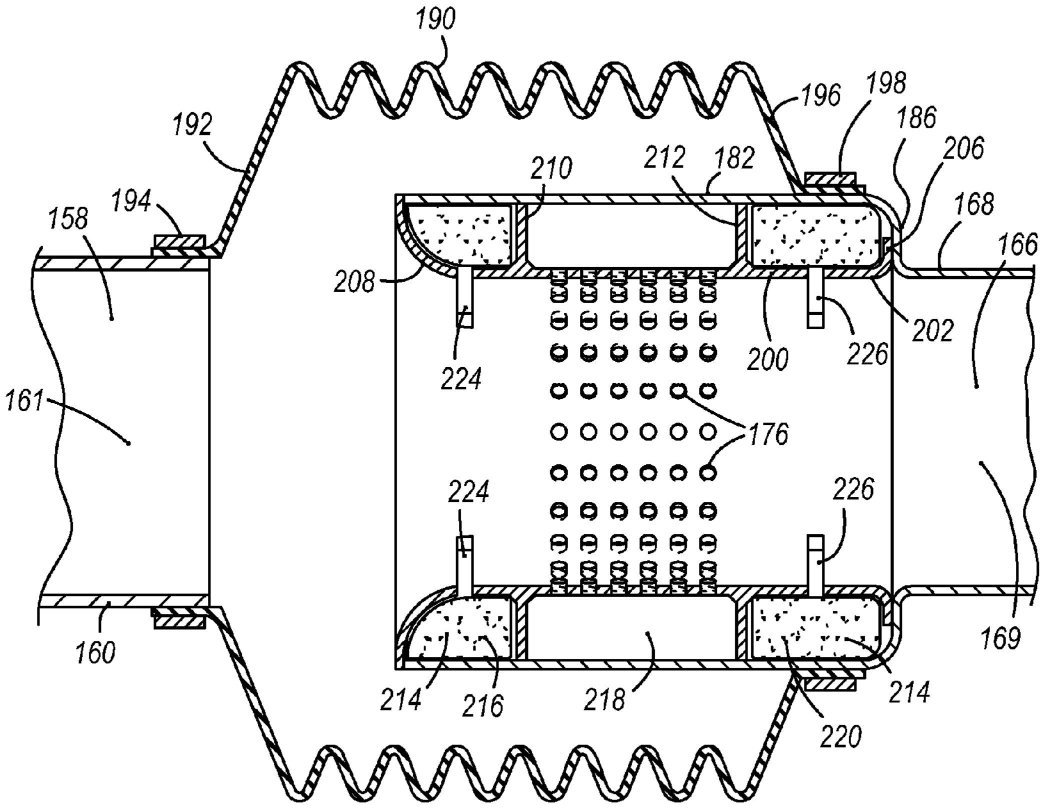
FIG. 3 is a cross section view taken through the air duct assembly of a second embodiment of the invention.

Referring to FIG. 3, another embodiment of the invention is shown. In FIG. 3, first duct 158 has a duct wall 160 defining an air flow passage 161. A second duct 166 has a duct wall 168 defining an air flow passage 169. The duct wall 168 of the second duct 166 is flanged outwardly at flange end wall 186 to form a duct wall 182 that is integral with the cylindrical wall 168. A bellows 190 surrounds the duct wall 182 and includes a left-hand end 192 connected to the first duct 158 and attached with a clamp 194. Bellows 190 has a right-hand end 196 that is attached to the duct wall 182 by a clamp 198.

As seen in FIG. 3, an annular sleeve 200 is installed inside the duct wall 182. The sleeve 200 has an interior passage 202 that aligns with the second duct 166 and has the same diameter as the duct wall 168 of the second duct 166 so that the sleeve 200 becomes an integral extension of the second duct 166. The right-hand end of sleeve 200 has a flange 206 suitably attached to the flange 186. The left-hand end of sleeve 200 has an outwardly flared wall 208 that is connected to the end of the duct wall 182. Internal radial extending dividing walls 210 and 212 are provided between the duct 182 and the sleeve 200 to thereby define separate chambers 216, 218 and 220. The chamber 218 is an attenuation chamber and a plurality of openings 176 are provided in the sleeve 200 to provide airflow communication between the duct 166 and the attenuation chamber 218. FIG. 3 shows that a hydrocarbon adsorbing material 214 is housed within the chambers 216 and 220. The hydrocarbon adsorbing material can be activated charcoal or other material capable of adsorbing hydrocarbons. Slots 224 are provided in the sleeve 200 to communicate airflow from the duct 166 to the hydrocarbon adsorbing material 214 housed in the chamber 216. Similar slots 226 are provided in the sleeve 200 to communicate airflow to the hydrocarbon adsorbing material 214 housed in the chamber 220. The presence of the hydrocarbon adsorbing material within a chamber may influence the sound attenuating characteristics, and accordingly, the hydrocarbon adsorbing material can be located in only some of the chambers or all of the chambers as appropriate to accomplish the needed level of sound attenuation and hydrocarbon adsorption.

During normal operation of the engine, sound will be attenuated by the communication of airflow perturbations into the attenuating chamber 218. Upon shutdown of the engine, it is known that some of the hydrocarbon combustion products will leak back through the throttle body or turbocharger and into the duct 166. These hydrocarbons will be exposed to the hydrocarbon adsorbing material 214 residing in the chambers 216 and 220 and will be adsorbed. Later, upon restarting of the engine, the hydrocarbons will be released from the hydrocarbon adsorbing material and flow back into the engine where these polluting products can be re-combusted and then processed through the engines pollution control system.

The foregoing drawings and description disclose typical embodiments of the invention. A person of ordinary skill in the art may make modifications within the scope of the invention. For example, in FIG. 2, the drawings show that the right-hand end 96 of the bellows 90 is attached onto the outer surface of the sleeve 78. As an alternative, the right-hand end 96 of the bellows 90 can be attached onto the outer surface of the second duct 66. Although the drawings herein show hose clamps for attaching the bellows, it will be understood that other mechanical fasteners, adhesives, friction or snap attachments can be employed. In addition, it will be understood that the relative sizes of the sound attenuation chamber and the hydrocarbon adsorbing chambers can be modified as desired to optimize the performance of the duct assembly of this invention, and that any number of chambers can be employed. The ducts and the sleeves are shown herein as being circular cylinders, however, the ducts and sleeve can be other tubular shapes such as octagonal, hexagonal, oval, or square cross section.

Thus, the invention offers a method to longitudinally consolidate an induction clean air duct bellows and a high frequency tuner. Today, these components are packaged in series along the duct. This arrangement will axially consolidate these parts and provide a flow liner within the bellows. This feature will reduce internal flow restriction by improving the boundary shape. Alternatively, all or part of the high frequency tuner cavity can also be used to package a hydrocarbon adsorbing material. The cavity for the hydrocarbon adsorbing material is well positioned to capture the hydrocarbons and also have an interior surface adjacent to the flow field to regenerate the adsorbing material.

What is claimed is:

1. An air duct assembly for ducting air from an air cleaner housing to an engine comprising:

a first duct having an air flow passage communicating with the air cleaner housing;

a second duct spaced from the first duct and having an air flow passage communicating with the engine, said second duct having a first cylindrical wall defining the air flow passage of the second duct and having a second cylindrical wall located radially outboard of the first cylindrical wall to form a chamber between the first and second cylindrical walls;

a plurality of openings in the first cylindrical wall to communicate between the air flow passage of the second duct and the chamber;

and a flexible bellows having a convoluted wall and connecting the first and second ducts to conduct air flow across the space between the first and second ducts as the first and second duct move relative one another during movement of the engine, said convoluted wall of the flexible bellows being radially outboard of the airflow passages defined by the first duct and the second duct and said flexible bellows overlying the second cylindrical wall.

2. The air duct assembly of claim 1 further comprising the second duct having a bell mouth defining an open end of the air flow passage of the second duct.

3. The air duct assembly of claim 1 further comprising one of the first and second cylindrical walls extending to connect with the engine and the other of the first and second cylindrical walls being provided by a tubular sleeve.

4. The air duct assembly of claim 3 further comprising the sleeve providing the second cylindrical wall.

5. The air duct assembly of claim 3 further comprising the sleeve providing the second cylindrical wall.

6. The air duct assembly of claim 3 further comprising the sleeve providing radially extending walls dividing the chamber into a plurality of chambers.

7. The air duct assembly of claim 6 further comprising a hydrocarbon adsorbing material provided in at least some of the plurality of chambers.

8. The air duct assembly of claim 1 further comprising a hydrocarbon adsorbing material provided in the chamber.

9. The air duct assembly of claim 1 further comprising said chamber being divided into a plurality of chambers and a hydrocarbon adsorbing material provided in at least some of the plurality of chambers.

10. The air duct assembly of claim 1 further comprising the air flow passage of the second duct, the chamber, the first and second cylindrical walls, and the bellows being concentrically positioned in relation to one another.

* * * * *